US012093916B1

(12) United States Patent
Terry

(10) Patent No.: US 12,093,916 B1
(45) Date of Patent: Sep. 17, 2024

(54) SYSTEMS AND METHODS FOR TRANSFORMING ACCOUNT CONTROLS OVER TIME

(71) Applicant: Wells Fargo Bank, N.A., San Francisco, CA (US)

(72) Inventor: Sharon Terry, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 17/732,454

(22) Filed: Apr. 28, 2022

(51) Int. Cl.
*G06Q 20/40* (2012.01)
*G06Q 20/22* (2012.01)

(52) U.S. Cl.
CPC ......... *G06Q 20/2295* (2020.05); *G06Q 20/40* (2013.01)

(58) Field of Classification Search
CPC .................................................. G06Q 20/2295
See application file for complete search history.

(56) References Cited

U.S. PATENT DOCUMENTS

| | | | | |
|---|---|---|---|---|
| 5,350,906 A | * | 9/1994 | Brody | G06Q 20/385 235/379 |
| 5,953,710 A | * | 9/1999 | Fleming | G06Q 20/405 235/380 |
| 7,899,742 B2 | | 3/2011 | Benkert et al. | |
| 8,127,982 B1 | * | 3/2012 | Casey | G06Q 40/02 235/382.5 |
| 8,157,164 B1 | * | 4/2012 | Billman | G07F 19/203 235/375 |
| 8,249,985 B2 | | 8/2012 | Giordano et al. | |
| 8,459,544 B2 | | 6/2013 | Casey et al. | |
| 8,718,633 B2 | | 5/2014 | Sprigg et al. | |
| 10,438,178 B2 | | 10/2019 | Kohli | |
| 10,445,739 B1 | * | 10/2019 | Sahni | G06Q 20/405 |
| 10,469,503 B1 | | 11/2019 | Tayloe | |
| 10,949,848 B2 | | 3/2021 | Barbuto et al. | |
| 10,963,878 B2 | | 3/2021 | Lee | |
| 2013/0060692 A1 | | 3/2013 | Typrin et al. | |
| 2015/0186863 A1 | | 7/2015 | Schwalb et al. | |

(Continued)

OTHER PUBLICATIONS

"Chase High School Checking Account | Student Banking | Chase" https://www.chase.com/personal/checking/high-school-checking, pp. 1-7.

(Continued)

*Primary Examiner* — William E Rankins
(74) *Attorney, Agent, or Firm* — Foley & Lardner LLP

(57) ABSTRACT

A system includes a processor and a data storage medium where the processor is caused to define a first set of account controls for a first user of a customer account based on customer information where the first set of account controls comprise first permissions and first restrictions, define a second set of account controls for a second user of the customer account where the second set of account controls comprise second permissions and second restrictions, determine that a control criteria has met a threshold, automatically adjust the first set of account controls to increase the first permissions and decrease the first restrictions, and transmit a notification to a first user device associated with the first user and to a second user device associated with the second user, the notification indicating that the first set of account controls have been adjusted.

15 Claims, 6 Drawing Sheets

(56) References Cited

U.S. PATENT DOCUMENTS

| | | |
|---|---|---|
| 2017/0061406 A1 | 3/2017 | Adams et al. |
| 2017/0223414 A1 | 8/2017 | Debickes et al. |
| 2018/0077254 A1 | 3/2018 | Appelman et al. |
| 2019/0325778 A1 | 10/2019 | Singh et al. |
| 2020/0242606 A1 | 7/2020 | Logan |
| 2020/0364690 A1 | 11/2020 | Brazier, III |
| 2021/0256485 A1* | 8/2021 | Fidanza ............. G06Q 30/0201 |
| 2021/0374709 A1* | 12/2021 | Suresh ................ G06F 16/2282 |
| 2022/0044243 A1* | 2/2022 | Rendahl ................. G06Q 10/10 |
| 2022/0383406 A1* | 12/2022 | Anasta ................. G06Q 20/405 |

OTHER PUBLICATIONS

"Debit Card & App Benefits for Parents | gohenry," https://www.gohenry.com/US/benefits-for-parents/, pp. 1-12.

"FamZoo Prepaid Card FAQs," https://blog.famzoo.com/p/famzoo-card-faqs.html, pp. 1-62.

"Youth Checking: No. Monthly Fees | USAA, " https://www.usaa.com/inet/wc/youth-checking-account, pp. 1-7.

* cited by examiner

SYSTEMS AND METHODS FOR TRANSFORMING ACCOUNT CONTROLS OVER TIME

BACKGROUND

Some entities may offer accounts for users that typically include certain features or capabilities that the user can implement. These entities may prohibit certain users of such accounts to use some features or capabilities for a variety of reasons. Currently, to obtain authorization to use such prohibited features, a user must apply for the authorization, provide documentation, or make some sort of showing that the entity should grant them authorization. Not only is obtaining such authorization time consuming, but users are often unaware that they may be eligible for such authorization or may not know how to apply for such authorization. Furthermore, requiring a user to apply for such authorization creates excessive data and requires unnecessary interactions with an account computer system, thereby increasing the amount of data that is transmitted back and forth over a network connecting the account computer system and a user device.

SUMMARY

One embodiment relates to a system. The system includes a processor and a data storage medium. The data storage medium stores processor-executable instructions that, when executed by the processor, cause the processor to define a first set of account controls for a first user of a customer account based on customer information entered or stored in the data storage medium, where the first set of account controls comprise first permissions and first restrictions. The processor is further caused to define a second set of account controls for a second user of the customer account based on the customer information, where the second set of account controls comprise second permissions and second restrictions. The processor is further caused to determine that a control criteria has met a threshold based on the customer information, automatically adjust the first set of account controls to increase the first permissions and decrease the first restrictions based on the determination that the control criteria has met the threshold, and transmit a notification to a first user device associated with the first user and to a second user device associated with the second user, where the notification indicates that the first set of account controls have been adjusted.

Another example embodiment relates to a method. The method includes defining, by a processor of an account control system, a first set of account controls for a first user of a customer account based on customer information entered or stored in a data storage medium, where the first set of account controls comprise first permissions and first restrictions. The method further includes defining, by the processor, a second set of account controls for a second user of the customer account based on the customer information, where the second set of account controls comprise second permissions and second restrictions. The method further includes determining, by the processor, that a control criteria has met a threshold based on the customer information, automatically adjusting, by the processor, the first set of account controls to increase the first permissions and decrease the first restrictions based on the determination that the control criteria has met the threshold, and transmitting, by the processor, a notification to a first user device associated with the first user and to a second user device associated with the second user, where the notification indicates that the first set of account controls have been adjusted Another example embodiment relates to a non-transitory computer readable medium. The non-transitory computer readable medium stores instructions that, when executed by one or more processors, cause the one or more processors to define a first set of account controls for a first user of a customer account based on customer information entered or stored in the data storage medium, where the first set of account controls comprise first permissions and first restrictions. The processor is further caused to define a second set of account controls for a second user of the customer account based on the customer information, where the second set of account controls comprise second permissions and second restrictions. The processor is further caused to determine that a control criteria has met a threshold based on the customer information, automatically adjust the first set of account controls to increase the first permissions and decrease the first restrictions based on the determination that the control criteria has met the threshold, and transmit a notification to a first user device associated with the first user and to a second user device associated with the second user, where the notification indicates that the first set of account controls have been adjusted.

Various objects, aspects, features, and advantages of the disclosure will be readily understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Figure 1:
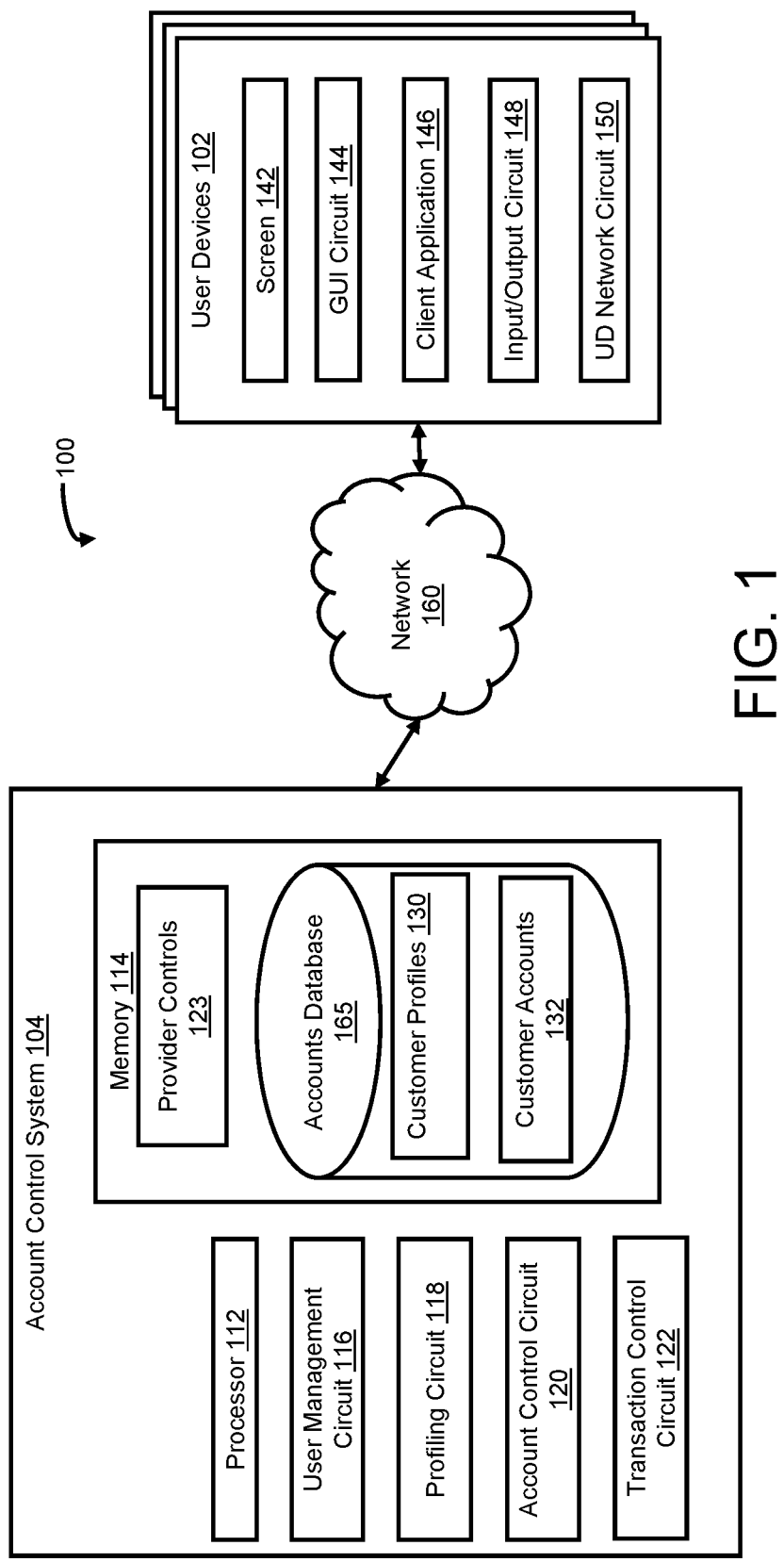
FIG. 1 is a schematic diagram of a system including an account control system, according to an example embodiment.

Various systems, methods, and apparatuses for facilitating account control of a first account for a first user are described herein. Herein, the first account for a first user may be referred to as a "minor account" or a "child account," though as will become apparent below, the first account can be transformed into a less restricted account based on certain criteria, with the less restricted account being referred to at times as an "adult account." The systems, methods, and apparatuses disclosed herein can be used to determine and implement a first set of controls (e.g., restrictions and permissions) for a first account based on one or more criteria being met. For example, the first account may be a minor account that is managed based on the age of the minor. The first set of features refer to a set of restrictions and permissions that define what actions a minor and/or a guardian may take in operating the first account for the minor. For example, an account permission may be that a minor may only withdraw a certain amount of funds from the first account within a certain period of time. As another example, another account permission may be that a guardian is allowed to check an account balance of the first account and make a deposit to the first account but may not be able to view specific transactions or withdrawals from the first account. A minor may be defined as any person falling below a certain age (e.g., 16, 18, 21, etc.). Throughout the present disclosure, a "minor" refers to the person in whose name the first account is opened even through the person eventually may reach an age where they are no longer considered a minor based on local laws or customs.

In some embodiments, the first account for the minor may be a banking account such as a savings account. In some embodiments, the first account for the minor may be a banking account such as a checking account. The first account for the minor may be linked to a bankcard (e.g., a debit card, etc.) which provides the minor access to the first account (e.g., check balance, withdraw funds, view account activity at a branch location or using an automated teller machine (ATM)). Similar to the first account itself, the first card may also be managed by one or more restrictions and/or permissions which may dynamically change as the minor ages and matures, and based on other criteria. The systems, methods, and apparatuses described herein can be used to facilitate transitional account control of a first account for a minor that changes as the minor ages and matures, and based on other criteria (e.g., account balances, patterns of deposits, whether a regularly occurring direct deposit has been set up, etc.). More specifically, the systems, methods, and apparatuses described herein may determine one or more restrictions and/or permissions to control a first account for a minor based on the age of the minor and/or the preferences of the parent or guardian overseeing the first account. The restrictions and/or permissions used to control the first account for the minor may change based on the age of the minor. Additionally, once the minor reaches a predetermined age (e.g., 16, 18, 21, or any other age used to define adulthood according to local laws or customs), the first account for the minor may transform to a second account type in which the minor (once they are an adult or a certain age) may have full access and control.

The embodiments described herein solve the technical problem of granting increased permissions to users of an account that are minors as the user ages and becomes eligible for increased permissions or reduced restrictions, which typically require users to proactively determine when such permissions and restrictions should be changed and request such changes from the provider institution, where the process to do so can require the completion of several steps, including requiring users to make such changes at a branch location or complete several steps over a network using one or more user devices. Accordingly, the system and methods disclosed herein automatically and dynamically update the control of a first account based on identifying information associated with the first account (e.g., age of a user of the first account), historical trends of the first account (e.g., how long the account has been opened, transaction history of the first account, etc.), and one or more predetermined account restrictions and/or permissions used to control the first account. By analyzing and comparing the account information and historical account transactions to the one or more restrictions and/or permissions to determine which features and capabilities are available to a first user (e.g., a minor) and a second user (e.g., a parent, guardian, etc.), and then adjusting the permissions and restrictions available to the first user and the second user, the systems and methods disclosed herein save physical resources that would otherwise be expended by a user visiting a branch of a provider to control the first account and saves computing resources to update the account controls through one or more user devices. Accordingly, by implementing a transformation of account controls over time based on analyzed criteria and without requiring user inputs either in person or via user devices over a network, the systems and methods described herein increase the efficiency of computing systems.

Referring now to FIG. 1, an illustration of a system 100 is shown according to an example embodiment. The system 100 can be implemented to facilitate the control of a first account. In some embodiments, the first account may be associated with a minor. The system 100 includes an account control system 104, a network 160, and user devices 102. Any of these components may be configured (e.g. via one or more network interfaces) to connect to each other and/or to an external device, such as user devices 102, via a network. The network 160 can provide communicable and operative coupling between the user devices 102, the account control system 104, and/or other components disclosed and described herein, to provide and facilitate the exchange of communications (e.g., data, instructions, requests, messages, values, commands). Accordingly, the network may include any network including wired (e.g., Ethernet) and/or wireless networks (e.g., 802.11X, ZigBee, Bluetooth, WiFi). In some embodiments, the network includes the Internet. In further embodiments, the network includes a proprietary banking network that can provide secure or substantially secure communications.

The account control system 104 may include a processor 112, a memory 114, a user management circuit 116, a profiling circuit 118, an account control circuit 120, and a transaction control circuit 122. The account control system 104 may be configured to improve control of a first account based on one or more restrictions and/or permissions. The account control system 104 may allow the restrictions and/or permissions to change based on the age of the minor associated with the first account which may provide a variety of benefits including: 1) increase responsibility of minor to manage a minor account as they get older to build better financial habits, 2) provide a smoother transition between an account for the minor and an adult account, 3) provide guardians with the ability to still interact with the minor account even if the minor has reached the age of adulthood. In some embodiments, the account control system 104 provides for these solutions by using the user management circuit 116, profiling circuit 118, account control circuit 120, and transaction control circuit 122 described herein. The account control system 104 is configured to create and manage a minor account based on the minor's age and other factors.

The processor 112 may include one or more microprocessors, application-specific integrated circuits (ASIC), a field-programmable gate arrays (FPGA), etc., or combinations thereof. The memory 114 may include, but is not limited to, electronic, magnetic, or any other storage or transmission device capable of providing a processor with program instructions. The memory may include magnetic disk, memory chip, read-only memory (ROM), random-access memory (RAM), Electrically Erasable Programmable Read-Only Memory (EEPROM), erasable programmable read only memory (EPROM), flash memory, or any other suitable memory from which a processor can read instructions. The memory 114 may include components, subsystems, data structures, modules, scripts, applications, or one or more sets of processor-executable instructions for controlling accounts, including any processes described herein. The user management circuit 116, the profiling circuit 118, the account control circuit 120, and the transaction control circuit 122 may be configured to access the memory 114 to perform operations described herein.

The memory 114 may store or include provider controls 123 and accounts database 165. The accounts database 165 may be configured to store information about one or more accounts associated with the account control system 104 including customer profiles 130 and customer accounts 132. In some embodiments, the customer profiles 130 and customer accounts 132 are associated with a user profile managed by a user management circuit 116.

The provider controls 123 can include account controls for creating accounts for minors as determined by a provider. As used herein, the term "provider" means any service provider, including any entity that may offer accounts to its customers, such as a financial institution, a bank, or a credit union. For example, the provider controls may include a restriction that a minor may not open an account without permission from the minor's parent or guardian. As another example, a provider control may be that the guardian must also have an account at the provider at which they wish to open the account for the minor. Additionally, the provider may require that the account for the minor must be linked to a guardian account. The provider may include a variety of other provider controls for managing the account for the minor which may not be described herein.

Referring now to the accounts database 165, the accounts database 165 includes customer profiles 130 and customer accounts 132. The customer profiles 130 may include any number of customer profiles associated with a guardian (e.g., guardian profiles) and customer profiles associated with a minor (e.g., minor profiles). Additionally, the customer accounts may include any number of customer accounts associated with a guardian (e.g., guardian accounts) and customer accounts associated with a minor (e.g., minor accounts). The minor profiles may correspond to any minor associated with a minor account which may be managed by the account control system 104. The minor profile may include identifying information about the minor. For example, the minor profile may include but are not limited to the name of the minor, the birthdate of the minor, the age of the minor with respect to a current date, an identification number associated with the minor (e.g., social security number, tax identification number, etc.), and any minor preferences. The minor preferences may include information about how involved with their account the minor wishes their guardian to stay once the minor account transitions to an adult account as will be described with respect to FIG. 3 below. In some embodiments, the minor preferences may be stored within the minor profile. In some embodiments, a minor profile may be linked to two or more minor accounts. For example, the minor profile may be linked to a primary minor account (e.g., a savings account) and a secondary minor account (e.g., a checking account).

The guardian profile may correspond to a guardian associated with a minor and responsible with managing the minor account for a minor. For example, the guardian may be a parent of the minor. The guardian profile may include identifying information about the guardian. For example, the guardian profile may include the name of the guardian, the birthdate of the guardian, an age of the guardian with respect to a current date, any identification numbers associated with the guardian (e.g., social security number, tax identification number, driver's license number, etc.), and any guardian preferences which may be used to manage the minor account. Since the guardian profile is associated with the minor profile, the guardian profile may be linked to its related minor profile within the account control system 104. In some embodiments, a single guardian profile may be linked to multiple minor profiles so that the guardian preferences in the single guardian profile may be used to manage the multiple minor profiles. For example, one guardian may wish to open a minor account for three of their children. In this case, the single guardian profile would be linked to each of the three minor profiles for each of the minors associated with the minor accounts. Additionally, a single minor account may be linked to multiple guardian accounts. For example, a child may have two parents each with a guardian profile which may be linked to their minor profile. As mentioned above, the guardian profile may include one or more guardian preferences which may be stored in the guardian profile as guardian restrictions and permissions. The guardian preferences may set restrictions and permissions that define how the minor may interact with the minor account. For example, guardian restrictions and permissions may allow the minor to view the account but not withdraw or deposit to the minor account. As another example, a minor permission may allow the minor to withdraw money from the minor account in certain circumstances (e.g., school lunch, educational supplies, special occasions such as a holiday or birthday of the minor of a contact within the minor's social circle based on social media data or phone contact data, etc.). In some embodiments, the provider controls 123, the guardian restrictions and permissions, and/or the minor guardian restrictions and permissions may be combined to create and control the minor account. The provider controls 123 and the guardian restrictions and permissions may primarily be used to manage the minor account before the minor account transitions to an adult account whereas the provider controls 123 and the minor restrictions and/or permissions may be used to manage the minor account after the minor has reached adulthood (e.g., and the minor account transforms into an adult account with similar permissions as the guardian account).

In some embodiments, the profiling circuit 118 may determine that no guardian profile (or an underdetermined guardian profile) associated with a guardian account is available, and may generate a guardian profile associated with the guardian account. This similarly may be done by the profiling circuit 118 for the minor profile associated with a minor account. The guardian account may be any account related to the guardian. For example, the guardian account may be a commercial, business, and/or personal banking account. Additionally, the minor account may be a checking or savings account. In some embodiments, the minor account may function as a part of (e.g., sharing the same account numbers) as the guardian account. This may be beneficial for a guardian who would like to have an account without opening an entirely new account for the minor. When the minor account would transition to an adult account, as will be explained in more detail below with respect to FIG. 3, the minor account would then become separate with its own numbers and other identifying markers.

The user management circuit 116 may be configured to manage a user profile. The user profile may include the provider controls 123, the customer profiles 130, and the customer accounts 132. The user management circuit 116 may provide the user access to at least certain functionalities of the account control system 104. The user management circuit 116 may be configured to communicate with the account control system 104. For example, the user management circuit 116 may provide information (e.g. including data stored in the memory 114) to user devices 102 (e.g. a device operated by a user). The information may include notifications, alerts, or messages. The information may also include graphical user interface (GUI) data for generating, rendering or accessing a GUI. The user management circuit 116 may provide the GUI (e.g. by providing the GUI data) to one or more of the user devices 102, and the user management circuit 116 may receive inputs from one or more of the user devices 102 via the GUI. For example, the user management circuit 116 may receive credentials from one or more of the user devices 102, and may provide access to the user profile responsive to verifying the user credentials.

The user management circuit 116 may also receive from one or more of the user devices 102 input regarding guardian permissions and/or restrictions and minor permissions and/or restrictions. For example, the user management circuit 116 may provide to one or more of the user devices 102 a GUI that includes a selectable object for selecting or setting any of the guardian permissions and/or restrictions by the guardian or the minor permissions and/or restrictions by the minor as described herein. More specifically, the GUI may provide a drop down menu where a user may enter their restrictions and/or permissions or a keyboard where the user may enter their restrictions and/or permissions.

In some embodiments, the user management circuit 116 may receive from one or more of the user devices 102 input regarding one or more guardian permissions and/or restrictions describing the access that a minor may have with respect to their minor account. For example, the user management circuit 116 may provide to one or more of the user devices 102 a GUI that includes a selectable object for selecting or setting the following restrictions and/or permissions: specific account information the minor may access, when and where the account may be accessed (e.g., parents can set that the account can only be accessed on the home network to prevent important financial information being accessed by a third party), specific account information the minor may modify (e.g., demographic information such as name, home address, email address, etc.), and spending limits or transfer limits or restrictions on the minor account. The spending limits for the minor account may be an amount (e.g., less than 5 dollars a day, or 150 dollars a month) or timeframes when the minor may withdraw from the account (e.g., the minor can spend 5 dollars a day on school lunch between the times of 11-1:30, the minor can spend 100 dollars during their birthday week or the birthday week of one of their contacts, etc.). The GUI may provide a survey or questionnaire to the guardian through the user management circuit 116 which may allow the guardian to input the guardian permissions and/or restrictions described above. The guardian permissions and/or restrictions received through the GUI may be stored in the memory 114.

In some embodiments, the user management circuit 116 may receive from one or more of the user devices 102 input regarding one or more minor restrictions and/or permissions describing the access that a guardian may have to their child's minor account once the minor account has transitioned to an adult account as will be described in more detail below with respect to FIG. 3. For example, the user management circuit 116 may provide to one or more of the user devices 102 a GUI that includes a selectable object for selecting or setting the following permissions and/or restrictions: specific account information the guardian can access (e.g., view the amount of money in the account, view transaction history), and specific actions the guardian may take to modify the account (e.g., whether the guardian can deposit money into the account or transfer money to or from the account) The GUI may provide a survey or questionnaire to the minor through the user management circuit 116 which may allow the minor to input the minor permissions and/or restrictions described above. The minor permissions and/or restrictions received through the GUI may be stored in the memory 114.

The user management circuit 116 may perform certain notification operations including transmitting a notification to a guardian or minor when funds have been deposited to the minor account and when funds have been withdrawn from the minor account. For example, the user management circuit 116 may transmit a notification that funds have been deposited. For example, the notification may include or specify an amount of funds that have been withdrawn, when the funds have been withdrawn, and where the funds were withdrawn. The notification may include a response option (e.g., a selectable object included in a GUI) that initiates transmission of a response to the notification to the account control system 104 via the user management circuit 116. The response may include, for example, an approval of the withdrawal of funds. When the minor account has transitioned to an adult account as described in FIG. 3, then the user management circuit 116 may only transmit notifications to the minor depending on the minor's preferences.

The profiling circuit 118 may be configured to determine the guardian profile and the minor profiles 125, and linking the profiles to the guardian account 126 and the minor account, respectively. For example, the profiling circuit 118 may receive profile information via the user management circuit 116 (e.g. a selection of user credentials or payment information including one or more account numbers and/or a preferred payment method). The transaction control circuit 122 may make use of the payment information to implement transactions via the account control system 104.

The account control circuit 120 may be configured to determine or generate one or more restrictions and/or permissions for managing the customer accounts. More specifically, the account control circuit 120 may combine the provider controls 123 and information from the guardian profile and the minor profile to develop an overall set of restrictions and/or permissions and permissions that may be used to manage the minor account. In some embodiments, the account control circuit 120 may resolve conflicts between the provider controls 123, the guardian permissions and/or restrictions, and the minor permissions and/or restrictions. For example, before the minor account has transitioned to an adult account, the account control circuit 120 may give priority to the guardian permissions and/or restrictions over the minor permissions and/or restrictions if they are ever in conflict. On the other hand, if the minor account has transitioned to an adult account, the account control circuit 120 may give priority to the minor permissions and/or restrictions over the guardian permissions and/or restrictions, or such account may grant no permissions to the guardian.

The transaction control circuit 122 may perform certain transaction operations for the customer accounts (e.g., minor accounts, guardian accounts, etc.) including transferring funds (e.g., transferring funds between the guardian account and the minor account), depositing funds to the minor account, or withdrawing funds from the minor account.

The account control circuit 120 may be configured to access the memory 114, and to implement financial transactions such as debiting, crediting, and/or routing of funds from accounts. The account control circuit 120 may receive and implement transaction requests from the account control system 104. The account control circuit 120 may also implement certain security measures, such as verification of credentials received along with, or in parallel to, the transaction requests.

The user devices 102 may be one or more mobile devices or any computing devices associated with a user. In this configuration, the user is a customer of the provider, such as the minor or the guardian. It will be appreciated that any number of similar user devices may be used. For example, a first user device 102 may be used by a first customer (such as the minor) to access and control the minor account, and a second user device 102 may be used by a second customer (such as the guardian) to access and control the minor account. The user devices 102 may be configured to exchange data over the network 160, execute software applications, access websites, generate graphical user interfaces, and perform other operations described herein. The user devices 102 may include one or more of a smartphone or other cellular device, a wearable computing device, a tablet, a portable gaming device, a laptop, a desktop, a portable computing device, etc.

In some embodiments, the user devices 102 includes a screen 142, a graphical user interface ("GUI") circuit 144, a provider institution client application 146, an input/output ("I/O") circuit 148, and a user device network circuit 150. The user device network circuit 150 enables the user devices 102 to connect to and to exchange information (e.g., data, signals, etc.) over the network 160. The I/O circuit 148 includes hardware and associated logic (e.g., modules, code, etc.) configured to facilitate exchanging information with a user and other devices. An input aspect of the I/O circuit 148 allows the user to provide information to the user devices 102, and may include, for example, a keyboard, a touchscreen, a microphone, a camera, a sensor, a fingerprint scanner, or any user input device capable of engaging with the user devices 102. An output aspect of the I/O circuit 148 allows the user to receive information from the user devices 102, and may include, for example, a digital display, a speaker, illuminating icons, LEDs, among others. The I/O circuit 148 may include systems, components, devices, and apparatuses that serve both input and output functions, allowing the account control system 104 to exchange information with the user devices 102. Such systems, components, devices, and apparatuses may include, for example, radiofrequency transceivers (e.g., RF or NFC-based transceivers, etc.) and other short range wireless transceivers (e.g., Bluetooth®, etc.).

The provider institution client application 146 is structured to permit management of at least one user account associated with the provider institution. Accordingly, the provider institution client application 146 can be communicably coupled with the account control system 104 via the network 160. Through this communicative coupling, the account control system 104 may be configured to provide displays regarding the particular provider institution service or provider institution client application 146 (e.g., account information, distribution preferences, etc.).

The GUI circuit 144 of the user devices 102 may be structured to present, control, and otherwise manage displays or graphical user interfaces on the user devices 102. In some embodiments, the GUI circuit 144 may present, control, or manage information generated and stored by the account control system 104. For example, the account control system 104 may generate a user interface (e.g., via the provider institution client application 146) that facilitates the input of information pertaining to customer preferences. The account control system 104 may provide the user interface to one or more of the user devices 102 to be displayed on the screen 142 via the GUI circuit 144. Input received by the screen 142 of one or more of the user devices 102 may be transmitted to the account control system 104 via the GUI circuit 144. The account control system 104 may then process the information input by the user and store the information in the accounts database 165. In some embodiments, the account control system 104 provides a web browser configured to display a web-based user interface via the GUI circuit 144.

In some embodiments, the GUI circuit 144 may be configured to present, control, and otherwise manage displays or graphical user interfaces on one or more of the user devices 102 when one or more of the user devices 102 is in an inactive state (e.g., sleep state, locked state, etc.). An inactive state of a user device 102 may provide the user limited access to the functionalities of the user device 102 (e.g., can only see a clock or access limited applications that do not require a user identification to access). An active state of a user device 102 may provide the user with access to all the functionalities of the user device 102 (e.g., can access all applications and tools that are accessible by the user device 102). In some embodiments, the screen 142 may present a display to a user when a user device 102 is in a locked state. Similarly, the I/O circuit 148 may be configured to receive an input when a user device 102 is in an inactive state and no applications have been accessed. For example, when a notification is transmitted to a user device 102 when in an inactive state, if the user dismisses (e.g., swipes the notification off the display screen) the notification, the I/O circuit 148 may detect such a dismissal. In some embodiments, the account control system 104 may be configured to receive a signal indicating the dismissal, and interpret the signal as, for example, an acceptance of an adjustment of account controls, such as a first user accepting a change in the account controls for the first user or a second user accepting the changed in account controls for the second user.

Figure 2:
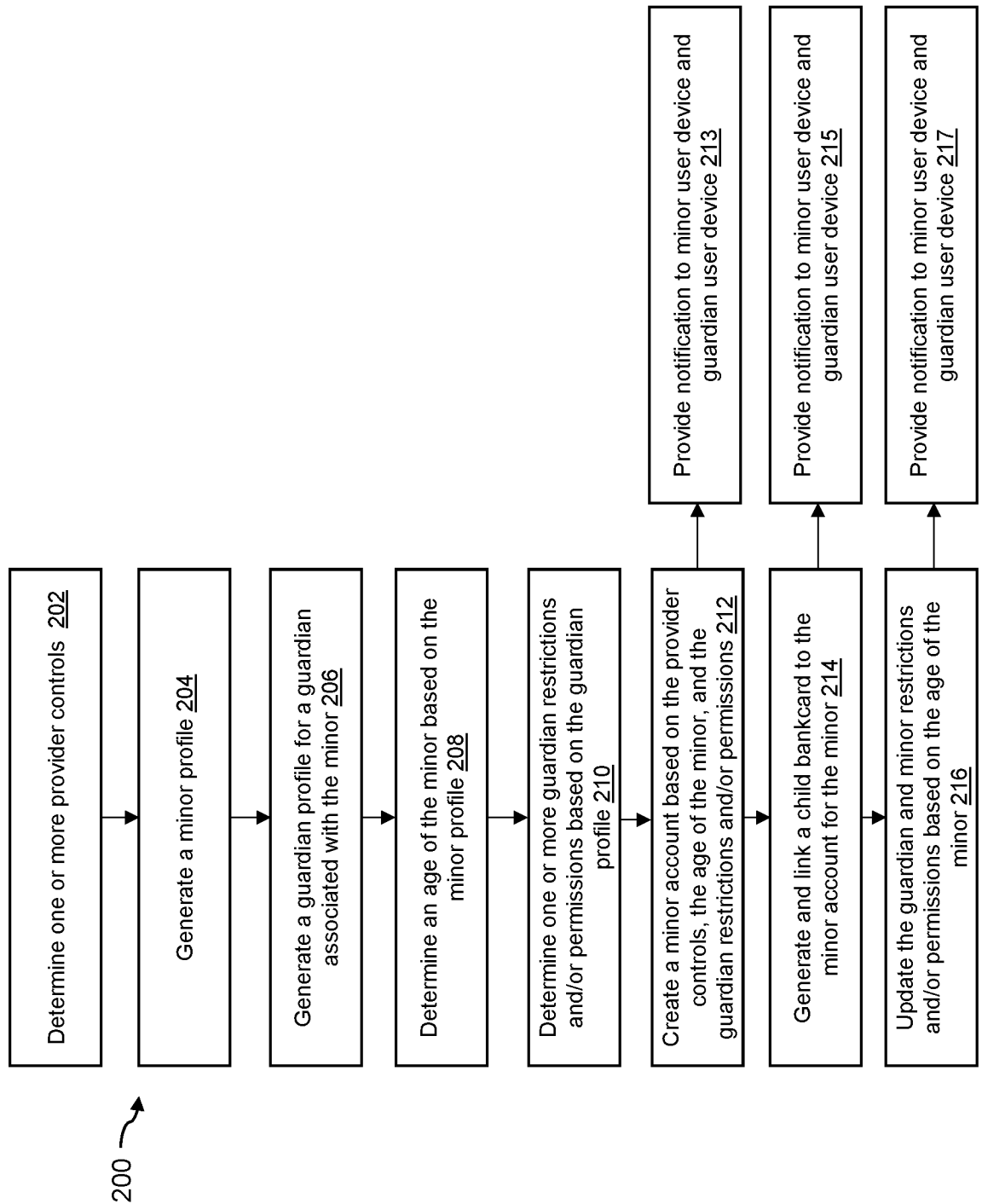
FIG. 2 is a flow chart showing a method for creating a first type of account for a customer meeting a first criteria, according to an example embodiment.
Figure 5:
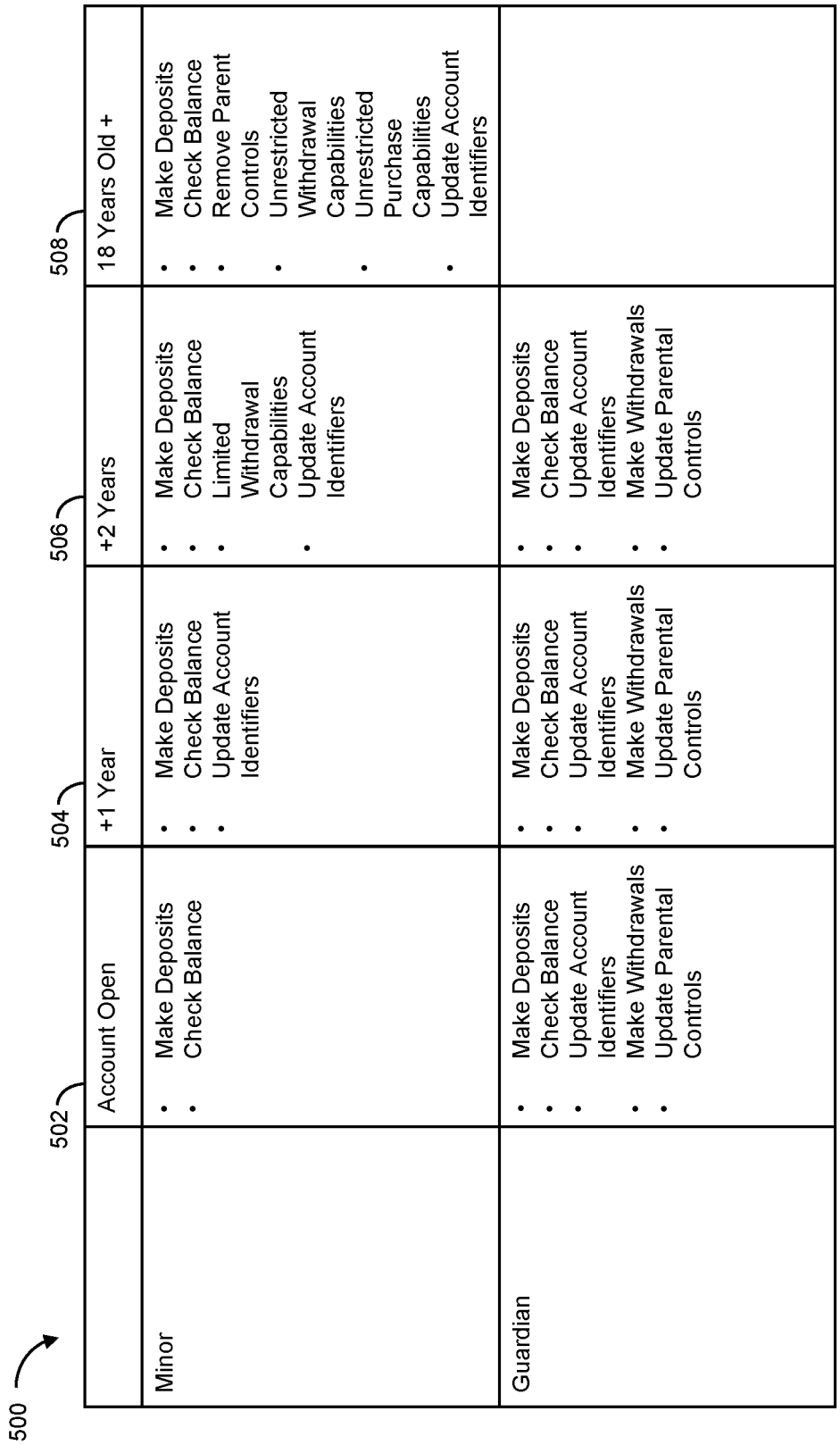
FIG. 5 is a chart showing account features for the first type of account of FIG. 2 and the second type of account of FIG. 3 according to a timeline indicator, according to an exemplary embodiment.
Figure 6:
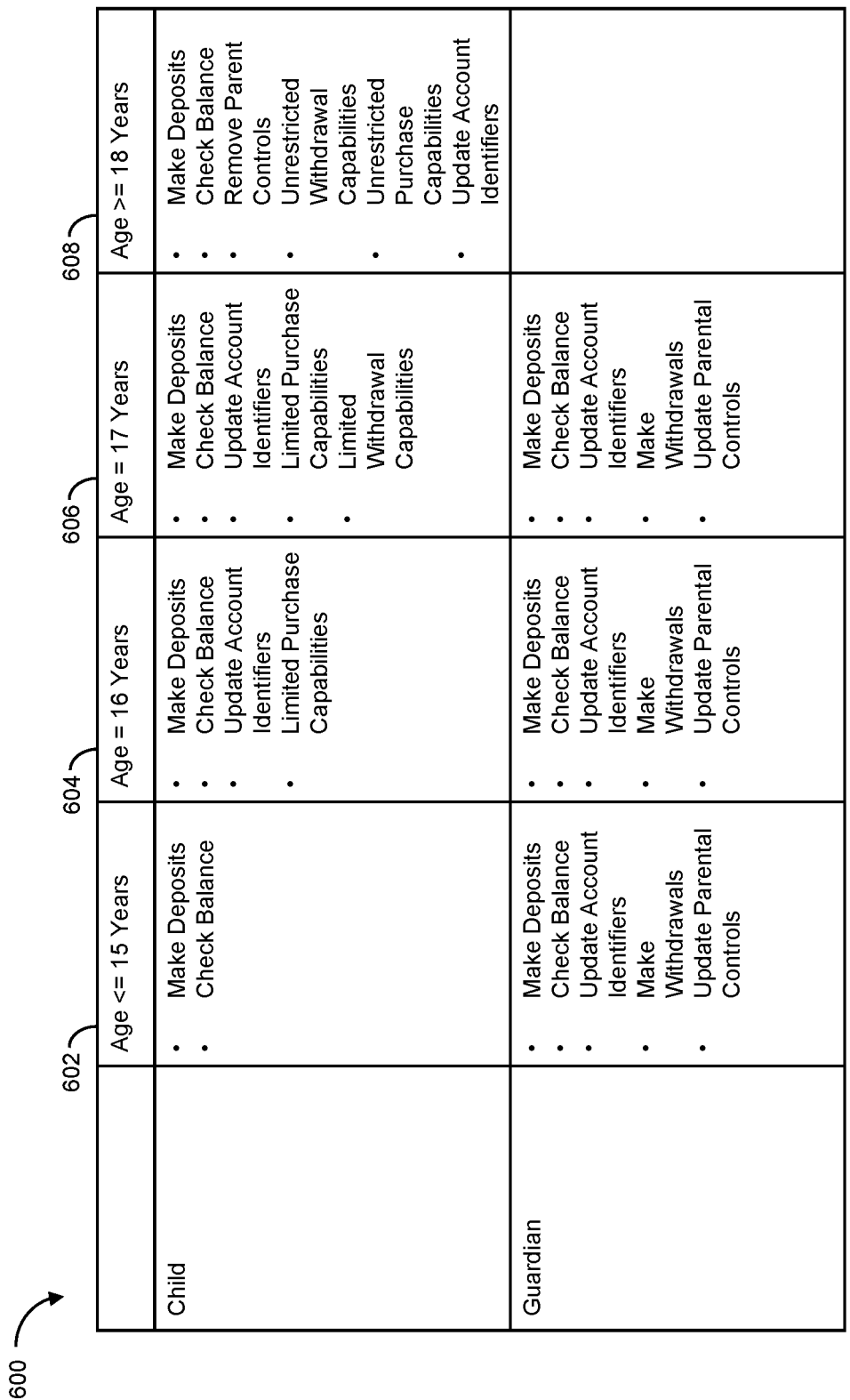
FIG. 6 is a chart showing account features for the first type of account of FIG. 2 and the second type of account of FIG. 3 according to an identifying indicator of the first type of account, according to an exemplary embodiment.

Referring now to FIG. 2, FIG. 2 is a flowchart of an example method 200 for creating a first type of account for a customer meeting a first criteria, according to an example embodiment. For example, the method 200 can be for creating a first account for a minor (e.g., a minor account) that can be executed by the account control system 104. The method includes steps 202 through 218. Generally, the method 200 may combine a variety of information to determine and implement one or more restrictions and/or permissions for creating and managing the minor account. At step 202, the account control system 104 determines one or more provider controls. The provider controls may describe system controls that guide the creation or management of a minor account. For example, the provider controls may include a restriction that a minor may not open an account without permissions from the minor's parent or guardian. As another example, provider controls may be that guardian must also have an account at the provider at which they wish to open the account for the minor. As another example, the provider controls may include a permission that the minor account may transition to an adult account once the minor associated with the minor account becomes a certain age (e.g., 16, 18, 21, etc.). The provider controls may be set by the provider where the minor account is being opened. FIGS. 5 and 6 show an exemplary embodiment of provider controls which may be set by the provider where the minor account is opened.

For example, FIG. 5, shows an exemplary chart 500 that provides an example of provider controls and demonstrates how the provider controls may be automatically updated over time. More specifically, chart 500 describes one or more account restrictions and/or permissions based on how long the minor account has been opened. For example, when a minor account is first opened, the provider may set the restrictions and/or permissions as described in column 502. More specifically, in column 502, the provider controls may include that the minor may make a deposit and check the balance of the minor account within the first year of the minor account being open while the guardian may make a deposit, check the balance of the minor account, update account identifiers (e.g., update the account names, etc.), make withdrawals from the minor account, and update parental controls for the minor account. In this example, the minor is unable to make withdrawals of any funds. After the first year of the minor account being opened, the provider may update and automatically set the provider controls as described in column 504. More specifically, in column 504, the provider controls may include that the minor may make a deposit, check the balance of the minor account, and update account identifiers (e.g., update the account names, etc.) within the first year of the minor account being open while the guardian may make a deposit, check the balance of the minor account, update account identifiers (e.g., update the account names, etc.), make withdrawals from the minor account, and update parental controls for the minor account. After the second year of the minor account being opened, the provider may automatically update and set the provider controls as described in column 506. More specifically, in column 506, the provider controls may include that the minor may make a deposit, check the balance of the minor account, update account identifiers (e.g., update the account names, etc.), and make account withdrawals in a limited capacity within the second year of the minor account being open while the guardian may make a deposit, check the balance of the minor account, update account identifiers (e.g., update the account names, etc.), make withdrawals from the minor account, and update parental controls for the minor account. Finally, once the minor reaches the age of 18, the provider may automatically update and set the provider controls as described in column 508. More specifically, in column 508, the provider controls may include that the minor may make a deposit, check the balance of the minor account, update account identifiers (e.g., update the account names, etc.), and make account withdrawals in an unlimited capacity while the guardian may no longer have any access rights or any ability to transact or monitor the account. In such an embodiment, the minor account has completed a transformation into a "full" or "complete" account for the minor once they become an adult.

As another example, FIG. 6, shows an exemplary chart 600 that provides an example of provider controls and demonstrates how the provider controls may be automatically updated over time. More specifically, chart 600 describes one or more provider controls based on the age of the minor. For example, when the minor is 15 years old or younger, the provider may set the provider controls as described in column 602. More specifically, in column 602, the provider controls may include that the minor may make a deposit and check the balance of the minor account while the guardian may make a deposit, check the balance of the minor account, update account identifiers (e.g., update the account names, etc.), make withdrawals from the minor account, and update parental controls for the minor account. When the minor is 16 years old, the provider may update and automatically set the provider controls as described in column 604. More specifically, in column 604, the provider controls may include that the minor may make a deposit, check the balance of the minor account, and update account identifiers (e.g., update the account names, etc.), and make purchases with the account funds in a limited capacity while the guardian may make a deposit, check the balance of the minor account, update account identifiers (e.g., update the account names, etc.), make withdrawals from the minor account, and update parental controls for the minor account. When the minor is 17 years old, the provider may automatically update and set the provider controls as described in column 606. More specifically, in column 606, the provider controls may include that the minor may make a deposit, check the balance of the minor account, update account identifiers (e.g., update the account names, etc.), make purchases with the account funds in a limited capacity, and make account withdrawals in a limited capacity while the guardian may make a deposit, check the balance of the minor account, update account identifiers (e.g., update the account names, etc.), make withdrawals from the minor account, and update parental controls for the minor account. Finally, once the minor reaches the age of 18, the provider may automatically update and set the provider controls as described in column 608. More specifically, in column 608, the provider controls may include that the minor may make a deposit, check the balance of the minor account, update account identifiers (e.g., update the account names, etc.), remove parental controls, make purchases with the account funds in an unlimited capacity and make account withdrawals in an unlimited capacity while the guardian may no longer have any access rights or any ability to transact or monitor the account. In such an embodiment, the minor account has completed a transformation into a "full" or "complete" account for the minor once they become an adult.

At step 204, the account control system 104 generates the minor profile. As described above, the minor profile describes information about the minor including the minor's name, the minor's age/birthdate, the minor's identification number, etc. The account control system 104 may generate the minor profile based on the information received by the user management circuit 116 through a GUI. For example, the minor may be requested to enter the information needed to generate the minor profile through a questionnaire or survey shown to the minor through the GUI (e.g., using a first user device 102). As another example, the guardian may be requested to enter the information needed to generate the minor profile through a questionnaire or survey shown to the guardian through the GUI (e.g., using a first user device 102).

At step 206, the account control system 104 generates the guardian profile. As described above, the guardian profile describes information about the guardian including the guardian's name, the guardian's age/birthdate, the guardian's identification number, etc. Additionally, the guardian profile may include guardian preferences that describe any parental limits the guardian would like to implement within the minor account. The guardian preferences may be categorized and implemented based on the age of the minor. For example, the guardian may institute spending limits on the minor account which may automatically change (e.g., get higher) as the minor grows older. The account control system 104 may generate the minor profile based on the information received by the user management circuit 116 through a GUI. For example, the guardian may be requested to enter the information needed to generate the guardian profile through a questionnaire or survey shown to the minor through the GUI (e.g., using a second user device 102).

At step 208, the account control system 104 determines the age of the minor based on the minor profile. The account control system 104 may determine the age of the minor by comparing a current date with the minor's birthdate. The minor's birthday, and therefore age, may be utilized to determine the eligibility of the minor for opening the minor account and what restrictions and/or permissions may apply to the minor account based on the minor's age.

At step 210, the account management system determines one or more guardian restrictions and/or permissions based on the guardian preferences described in the guardian profile. As described above, the guardian restrictions and/or permissions may include specific account information the minor may access, when and where the account may be accessed (e.g., parents can set that the account can only be accessed on the home network to prevent important financial information being accessed by a third party), specific account information the minor may modify (e.g., demographic information such as name, home address, email address, etc.), and spending limits or transfer limits or restrictions on the minor account.

At step 212, the account control system 104 creates a minor account based on the provider controls 123, the age of the minor, and the guardian restrictions and/or permissions determined in the preceding steps. For example, the provider controls may provide that if a minor is under the age of 16, then they may open a minor account with the permission and supervision of a guardian. For example, the account control system 104 can create a new account for the minor based on receiving an input from a first user device 102 associated with the minor indicating that the minor wishes to open a new account and based on receiving another input from a second user device 102 associated with the guardian approving the creation of the account. The input from the second user device 102 may set a spending limit or otherwise configure one or more permissions or restrictions on the new account, or the account control system 104 may automatically configure one or more permissions or restrictions on the new account based on one or more criteria, such as the minor's age. The account control system 104 can further configure the one or more permissions and restrictions based on the guardian profile for the guardian, the provider controls, and the minor profile for the minor.

At step 213, a notification is provided to a first user device 102 associated with the minor and a second user device 102 associated with the guardian. In some embodiments, the notification provided to the first user device 102 associated with the minor and the second user device 102 associated with the guardian indicate that the minor account has been created, the provider controls applicable to the account, and the permissions and restrictions applicable to the minor and to the guardian when accessing the account. In some embodiments, the same notification is provided to both the first user device 102 associated with the minor and the second user device 102 associated with the guardian. In some embodiments, a different notification is provided to both the first user device 102 associated with the minor and the second user device 102 associated with the guardian. For example, the notification provided to the first user device 102 associated with the minor may indicate that the minor account has been created, the provider controls applicable to the account, and the permissions and restrictions applicable to the minor when accessing the account, whereas the notification provided to the second user device 102 associated with the guardian may indicate that the minor account has been created, the provider controls applicable to the account, and the permissions and restrictions applicable to the minor and to the guardian when accessing the account. In some embodiments, the notification is provided to the second user device 102 associated with the guardian prior to a notification being provided to the first user device 102 associated with the minor, or the notification may be provided to the first user device 102 associated with the minor prior to being provided to the second user device 102 associated with the guardian.

At step 214, the account control system 104 generates and links a child bankcard to the minor account for the minor. The child bankcard may facilitate transactions (e.g., purchases, payments, etc.) using the minor account. In some embodiments, the child bankcard may be a debit card and the minor account may be a checking account. In some embodiments the child bankcard may be a credit card and the minor account may be either a checking account and/or a savings account. In some embodiments, the account control system 104 may open a checking account for the minor and associate the child bankcard with the checking account based on receiving an input form one of the user devices 102 of the minor or the guardian indicating that the minor would like to set up a direct deposit or that the minor has obtained a source of income and will need to regularly deposit paychecks. In some embodiments, the child bankcard may be provided to the minor when opening a savings account but the bankcard may not be "active" (e.g., able to be used to conduct transactions) or linked to an account of the minor (e.g., saving account or checking account) until the account control system 104 determines that the minor has reached a certain age. For example, the account control system 104 may link the bankcard to a checking account of the minor and/or activate the bankcard to enable the bankcard to be used to conduct transactions or withdraw up to a first threshold of funds from the checking account based on determining that the minor has reached the age of 17, and the account control system 104 may enable the bankcard to be used to conduct transactions or withdraw up to a second threshold of funds greater than the first threshold from the checking account based on determining that the minor has reached the age of 17 and has a monthly income exceeding an income threshold (e.g., an amount of funds such as $100, or a percentage of total funds between the minor's checking and saving's account such as 10% or 20%).

At step 215, a notification is provided to a first user device 102 associated with the minor and a second user device 102 associated with the guardian. In some embodiments, the notification provided to the first user device 102 associated with the minor and the second user device 102 associated with the guardian indicate that the child bankcard has been created and linked to the minor account for the minor. In some embodiments, the same notification is provided to both the first user device 102 associated with the minor and the second user device 102 associated with the guardian. In some embodiments, a different notification is provided to both the first user device 102 associated with the minor and the second user device 102 associated with the guardian. For example, the notification provided to the first user device 102 associated with the minor may indicate that the child bankcard has been created and linked to the minor account for the minor and permissions that the minor may undertake with the bankcard (e.g., check balance at an ATM), whereas the notification provided to the second user device 102 associated with the guardian may indicate that the child bankcard has been created and linked to the minor account for the minor and the permissions and restrictions the minor may undertake with the bankcard. In some embodiments, the notification is provided to the second user device 102 associated with the guardian prior to a notification being provided to the first user device 102 associated with the minor, or the notification may be provided to the first user device 102 associated with the minor prior to being provided to the second user device 102 associated with the guardian.

At step 216, the account control system 104 updates the guardian restrictions and/or permissions and the minor restrictions and/or permissions based on the age of the minor. For example, a guardian may decide that the minor may have increased spending limits as the minor becomes older (e.g., $10 extra dollars to spend per month for every extra year of age) or the guardian may decide that the minor may be able to spend money in more places (e.g., no in-app purchases allowed till the minor is 15 years old) as the minor grows in age and increases their financial literacy. Additionally, the guardian restrictions and/or permissions may be updated based on the deposits received by the minor account or the funds available in the minor account. For example, if the minor obtains an after school job at age 14, the guardian may increase the spending limits on the minor account in accordance with the amount extra income earned. On the other hand, if the minor loses the after school job, the guardian may reduce the spending limits on the minor account in accordance with the amount of income lost. As another example, if the amount of funds available is below a certain level (e.g., $500 dollars), the guardian may further limit spending from the account until the amount of fund available is above the certain level.

The guardian restrictions and/or permissions may be updated automatically based on the age of the minor, the funds available in the minor account, deposit and withdrawal history (e.g., increase amount of funds that can be withdrawn if deposits are trending upward), and whether the minor has completed certain requirements (e.g., enable greater withdrawals amounts if the minor has completed online financial literacy lessons offered by the provider via the minor account). In some embodiments, updating the minor restrictions and/or permissions automatically updates the guardian restrictions and/or permissions without further input from the guardian, minor, or the provider. For example, various minor account management rule plans may be stored within the provider controls 123 which the guardians may select to manage their child's account when setting up the minor account. These rule plans may include age benchmarks wherein the minor account automatically has less and less control by the guardian based on the age of the minor. For example, the account control system 104 may implement a low control rule plan for minors who are not as responsible as older minors where the minor has only slight increases in control (e.g., only slight increases in spending limits, or activation of one additional permission), the account control system 104 may implement a medium control rule plan where the minor has medium increases in control of the minor account as they age (e.g., increased spending limits, the ability to withdraw money at an ATM, activation of further additional permissions, etc.), and the account control system 104 may implement a high control rule plan where the minor has major increases in control of the minor account as the minor ages (e.g., unlimited ability to withdraw funds, activation of further additional permissions, deactivation of guardian permissions, etc.) if the minor has demonstrated strong responsibility (e.g., a savings rate above a threshold, does not overdraw their account, does not spend past the spending limits set by the account control system 104 or their guardians, etc.). In some embodiments, the guardian may select which of these plans they would like the account control system 104 to use to manage the minor account. In other embodiments, the account control system 104 may monitor the behavior of the minor account and automatically select one of these plans to manage the account of the minor based on the behavior observed. For example, the account control system 104 may implement a high control rule plan if the minor is at least 17 years of age, has had the account at the provider for at least 1 year, and has a history of keeping an average daily balance of funds in the account in excess of a $500 threshold), whereas the account control system 104 may implement a medium control rule plan if the minor is 16 years of age, has had the account at the provider for less than 1 year, and has a history of keeping an average daily balance of funds in the account in excess of a $250 threshold but less than a $500 threshold, and whereas the account control system 104 may implement a low control rule plan if the minor is 15 years of age or younger, has had the account at the provider for less than 1 year, and has a history of keeping an average daily balance of funds in the account below a $200 threshold or has over withdrawn the account a threshold number of times within the past year (e.g., 1 instance of an over withdrawal, 2 instances of an over withdrawal, etc.).

At step 217, a notification is provided to a first user device 102 associated with the minor and a second user device 102 associated with the guardian. In some embodiments, the notification provided to the first user device 102 associated with the minor and the second user device 102 associated with the guardian indicate that the guardian and minor restrictions and/or permissions have been updated. In some embodiments, the same notification is provided to both the first user device 102 associated with the minor and the second user device 102 associated with the guardian. In some embodiments, a different notification is provided to both the first user device 102 associated with the minor and the second user device 102 associated with the guardian. For example, the notification provided to the first user device 102 associated with the minor may indicate that the guardian and minor restrictions and/or permissions have been updated and specify the new minor permissions, whereas the notification provided to the second user device 102 associated with the guardian may indicate that the guardian and minor restrictions and/or permissions have been updated and specify the new guardian restrictions and the new minor permissions. In some embodiments, the notification is provided to the second user device 102 associated with the guardian prior to a notification being provided to the first user device 102 associated with the minor, or the notification may be provided to the first user device 102 associated with the minor prior to being provided to the second user device 102 associated with the guardian.

In some embodiments, the minor account may also be automatically managed based on the life events related to the minor and/or the guardian. For example, if the minor receives an influx of funds (e.g., through an extra job, an inheritance, a gift, a prize, etc.), the account control system 104 may automatically increase the spending limits on the minor account (e.g., spending limits increased from $100 to $200 dollars a month). As another example, if the guardian account has a significant decrease in funds (e.g., through loss of a job, negative investment returns, etc.), then the account control system 104 may automatically decrease the spending limits.

Figure 3:
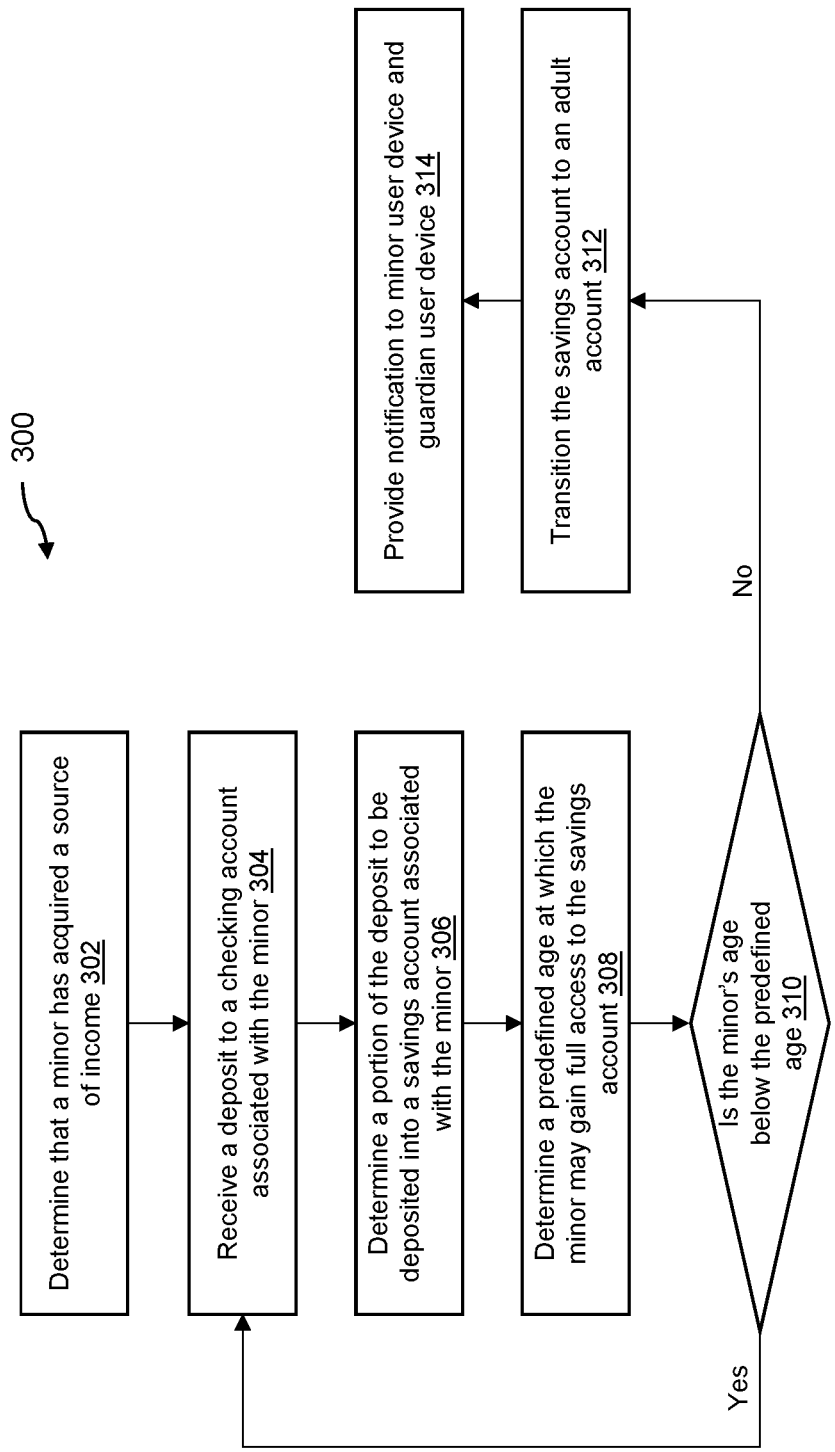
FIG. 3 is a flow chart showing a method for transforming the first type of account of FIG. 2 to a second type of account, according to an example embodiment.

Referring now to FIG. 3, FIG. 3 is a flowchart of an example method 300 for transforming the first type of account of FIG. 2 to a second type of account, according to an example embodiment. For example, the minor account of FIG. 2 can be transformed to an adult account by the account control system 104. As described above, the minor account created as described above transforms based on at least the minor's age in order to provide a gradual transition between full or partial guardian control to full minor control and minimal or no guardian control (once the minor has reached adulthood, which can be based on an age of the minor according to local laws or customs). Once the minor reaches adulthood, the minor account completes the transition process by transforming from a minor account to an adult account. The adult account may provide full access and control to the minor at which point they may decide how much access and control to provide to the guardian (e.g., once their account transitions to an adult account, the child that is now an adult may decide to provide the guardian with no access or control or they may decide to provide the guardian with limited access and control, such as the ability to make deposits and check balances). The process for deciding how much access and control to give the guardian is described in more detail below with respect to FIG. 4. In some embodiments, a minor associated with the minor account may acquire a source of income (e.g., an afterschool job, a summer job, etc.) wherein they may regularly deposit a paycheck into a checking account. Through the guardian preferences, the guardian profile for the guardian supervising the minor account may specify that a certain amount of the minor's paycheck be set aside in the minor account where the guardian may manage the minor account. The method 300 describes a process for setting aside a portion of the minor's paycheck in the minor account and eventually transitioning the minor account to an adult account once the child reaches adulthood. In some embodiments, the method 300 may be combined with the method 200. More specifically, the method 300 may be executed by the account control system 104 directly after step 214 of the method 200.

At step 302, the account control system 104 determines that a minor has acquired a source of income. The account control system 104 may determine that the minor has acquired a source of income based on information received from the minor or the guardian through a GUI via one of the user devices 102. In some embodiments, the account control system 104 determines that the minor has acquired a source of income based on the transaction history of the minor account. For example, if a check of a similar amount is deposited into the minor account every two weeks, the account control system 104 may determine that minor has acquired a source of income. In some embodiments, the account control system 104 determines that the minor has obtained a source of income based on an input received from a user device 102 associated with at least one of the minor the guardian indicating that the minor has obtained a source of income and will need to regularly deposit funds into their account as a result.

At step 304, the account control system 104 receives a deposit from the source of income into a checking account associated with the minor. In some embodiments, the checking account associated with the minor may be the minor account for the minor. In other embodiments, the checking account associated with the minor may be a separate and different account to the minor account for the minor.

At step 306, the account control system 104 determines a portion of the deposit received at step 304 to be deposited into a savings account for the minor. The account control system 104 may determine the portion of the deposit to save based on at least one of the guardian restrictions and/or permissions stored within the customer profiles 130 or within the provider controls 123. In some embodiments, the portion of the deposit may be defined as a percentage of the deposit. For example, a parent may specify that their child save 50% of their paycheck to be deposited into the minor savings account. In other embodiments, the portion of the deposit may be defined as an amount of the deposit. For example, a parent may specify that their child save $100 dollars from their paycheck to be deposited into the minor savings account.

At step 308, the account control system 104 determines a predefined age at which the minor may gain full access to the savings account associated with the minor. In some embodiments, the predefined age may be an age at which the minor may become an adult. For example, the predefined age may be 16, 18, or 21 based on the laws or customs of the local jurisdiction. As another example, a predefined age may be based on the restrictions and/or permissions set by the provider (e.g., provider controls 123).

At step 310, the account control system 104 compares the age of the minor to the predetermined age determined at step 308 to determine whether the minor's age is less than the predetermined age. If the minor's age is below the predetermined age (e.g., the minor is not yet an adult), then the method 300 will proceed back to step 304 where a portion of the minor's next paycheck will continue to be placed in the savings account to be supervised by the guardian. If the minor's age is not below the predefined age (e.g., the minor has now become an adult), then the method 300 will proceed to step 312.

At step 312, the account control system 104 transitions the minor account created at step 212 into an adult account. The adult account provides the minor (who is now an adult) full access and permission to control the account. More specifically, the adult account may remove any guardian restrictions and/or permissions previously used to manage the minor account. In some embodiments, the account control system 104 may then use the minor restrictions and/or permissions to manage the adult account as opposed to the guardian restrictions and/or permissions. The process for managing the adult account according to the minor restrictions and/or permissions is described in more detail below with respect to FIG. 4. In some embodiments, the adult account may be a savings account, a checking account, or any other type of banking account.

The method 300 completes at step 314 where a notification is provided to a first user device 102 associated with the minor and a second user device 102 associated with the guardian. In some embodiments, the notification provided to the first user device 102 associated with the minor and the second user device 102 associated with the guardian indicate that the minor's saving account has transitions to an adult account. In some embodiments, the same notification is provided to both the first user device 102 associated with the minor and the second user device 102 associated with the guardian. In some embodiments, a different notification is provided to both the first user device 102 associated with the minor and the second user device 102 associated with the guardian. For example, the notification provided to the first user device 102 associated with the minor may indicate that the minor's saving account has transitioned to an adult account and may specify permissions and restrictions associated with the new status of the account, whereas the notification provided to the second user device 102 associated with the guardian may indicate that the minor's saving account has transitioned to an adult account and indicate that the guardian no longer has access to the account. In some embodiments, the notification is provided to the second user device 102 associated with the guardian prior to a notification being provided to the first user device 102 associated with the minor, or the notification may be provided to the first user device 102 associated with the minor prior to being provided to the second user device 102 associated with the guardian.

Figure 4:
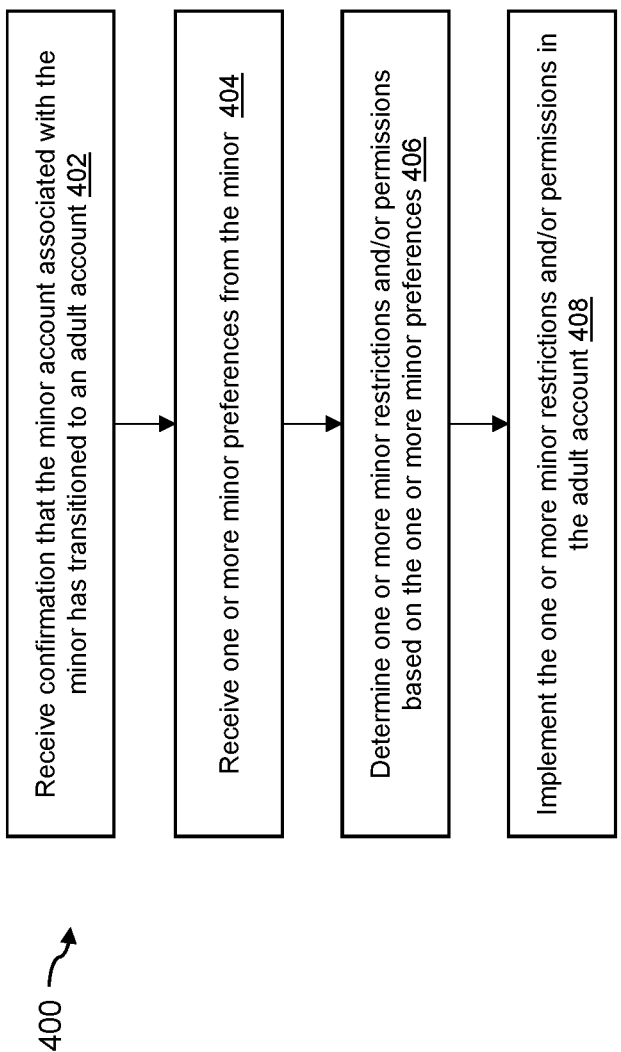
FIG. 4 is a flow chart showing a method for updating account control features for the second type of account of FIG. 3, according to an example embodiment.

Referring now to FIG. 4, FIG. 4 is a flowchart of an example method 400 for updating account control features for the second type of account created in method 300, according to an example embodiment. As mentioned above, once the minor account for the minor has transitioned to an adult account, the account control system 104 may manage the account based on the minor restrictions and/or permissions. The minor restrictions and/or permissions may describe the access that a guardian may have to the account once the minor account has transitioned to an adult account.

The method 400 begins at step 402. At step 402, the account control system 104 receives confirmation that the minor account for the minor has transitioned to an adult account as described in FIG. 3. Once the account control system 104 has confirmed that the minor account has transitioned to the adult account, the method 400 proceeds to step 404. At step 404, the account control system 104 receives one or more preferences from the minor (e.g., via the first user device 102 associated with the minor). As described above, the preferences may include information about how involved with their account the minor wishes their guardian to stay once the minor account transitions to an adult account. For example, one minor may have a preference that their guardian not to have any access to their account. As another example, a minor may have a preference that a guardian may contribute and have access to the account but the guardian may not modify or change the account in any way. The account control system 104 may receive the one or more preferences through a GUI as described above (e.g., via the second user device 102 associated with the guardian).

At step 406, the account control system 104 determines one or more restrictions and/or permissions based on the one or more preferences. These restrictions and/or permissions may include: specific account information the guardian can access (e.g., view the amount of money in the account, view transaction history), and specific actions the guardian may take to modify the account (e.g., whether the guardian can deposit money into the account).

At step 408, the account control system 104 implements one or more restrictions and/or permissions in the adult account to manage the adult account. In some embodiments, the restrictions and/or permissions may be used to determine the access that the guardian has to the account associated with the minor once the minor becomes an adult.

Though the accounts disclosed with the present application relate to savings accounts and checking accounts, other types of accounts may also be used. For example, the minor account may be retirement saving and/or investment accounts (e.g., 401k accounts, 403*b* accounts, Roth IRA accounts, etc.). These child retirement and saving accounts may be managed similar to minor accounts mentioned above and also automatically adjust as the child ages. For example, a higher amount of money may be added to the child's account as the child ages.

As another example, the minor account may be a college savings account (e.g., 529 plan account, etc.). The college savings account may be managed similar to the minor accounts mentioned above and also automatically adjust as the child ages. For example, after a child turns 16 and determines they would like to attend college, the contributions to the college savings account may increase as the child increases in age. The embodiments described herein have been described with reference to drawings. The drawings illustrate certain details of specific embodiments that provide the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As utilized herein, terms of degree such as "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to any precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that terms such as "exemplary," "example," and similar terms, as used herein to describe various embodiments, are intended to indicate that such embodiments are possible examples, representations, or illustrations of possible embodiments, and such terms are not intended to connote that such embodiments are necessarily extraordinary or superlative examples.

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any element on its own or any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the drawings. It should be noted that the orientation of various elements may differ according to other exemplary embodiments, and that such variations are intended to be encompassed by the present disclosure.

As used herein, terms such as "engine" or "circuit" may include hardware and machine-readable media storing instructions thereon for configuring the hardware to execute the functions described herein. The engine or circuit may be embodied as one or more circuitry components including, but not limited to, processing circuitry, network interfaces, peripheral devices, input devices, output devices, sensors, etc. In some embodiments, the engine or circuit may take the form of one or more analog circuits, electronic circuits (e.g., integrated circuits (IC), discrete circuits, system on a chip (SOCs) circuits, etc.), telecommunication circuits, hybrid circuits, and any other type of circuit. In this regard, the engine or circuit may include any type of component for accomplishing or facilitating achievement of the operations described herein. For example, an engine or circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

An engine or circuit may be embodied as one or more processing circuits comprising one or more processors communicatively coupled to one or more memory or memory devices. In this regard, the one or more processors may execute instructions stored in the memory or may execute instructions otherwise accessible to the one or more processors. The one or more processors may be constructed in a manner sufficient to perform at least the operations described herein. In some embodiments, the one or more processors may be shared by multiple engines or circuits (e.g., engine A and engine B, or circuit A and circuit B, may comprise or otherwise share the same processor which, in some example embodiments, may execute instructions stored, or otherwise accessed, via different areas of memory).

Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be provided as one or more suitable processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given engine or circuit or components thereof may be disposed locally (e.g., as part of a local server, a local computing system, etc.) or remotely (e.g., as part of a remote server such as a cloud based server). To that end, engines or circuits as described herein may include components that are distributed across one or more locations.

An example system for providing the overall system or portions of the embodiments described herein might include one or more computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

Although the drawings may show and the description may describe a specific order and composition of method steps, the order of such steps may differ from what is depicted and described. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated.

Other substitutions, modifications, changes and omissions may be made in the design, operating conditions, and arrangement of the embodiments without departing from the scope of the present disclosure as expressed in the appended claims.

What is claimed is:
1. A system comprising:
a processor; and
a data storage medium storing processor-executable instructions that, when executed by the processor, cause the processor to:
define a first set of account controls for a first user of a first customer account of a first account type based on first customer information entered or stored in the data storage medium, wherein the first set of account controls comprise first permissions and first restrictions, and wherein the first user is a minor;
define a second set of account controls for a second user of the first customer account based on second customer information, wherein the second set of account controls comprise second permissions and second restrictions, and wherein the second user is a guardian of the first user;
determine that a control criteria has met a threshold based on at least one of the first customer information or the second customer information;
automatically adjust the first set of account controls to increase the first permissions and decrease the first restrictions based on the determination that the control criteria has met the threshold;
receive a plurality of automated account management plans, each automated account management planning defining a set of account controls;
monitor a behavior of the first customer account;
automatically select an automated account management plan from the plurality of automated account management plans based on the monitored behavior;
transmit, via a first graphical user interface a notification to a first user device associated with the first user, and a notification via a second graphical user interface to a second user device associated with the second user, each of the notifications indicating that the first set of account controls are adjusted based on the set of account controls of the selected automated account management plan;
receive an input via at least one of the first graphical user interface or the second graphical user interface while the first user device or the second user device are in an inactive state, wherein the input is a dismissal of the notification from the first user device or from the second user device;
in response to receiving the input, generate a control signal to adjust the first set of account controls based on interpreting the dismissal of the notification as acceptance to adjust the first set of account controls;
adjust the first set of account controls based on the control signal;
establish a second customer account associated with the first user and the second user, wherein the second customer account is a second account type different than the first account type;
link a bankcard to the first customer account and the second customer account; and
activate the bankcard to enable the bankcard to be used to conduct a transaction with the second customer account.

2. The system of claim 1, wherein the processor-executable instructions further cause the processor to automatically adjust the second set of account controls to decrease the second permissions based on the determination that the control criteria has met the threshold.

3. The system of claim 1, wherein the processor-executable instructions further cause the processor to automatically adjust the second set of account controls to increase the second restrictions based on the determination that the control criteria has met the threshold.

4. The system of claim 1, wherein the notification is a first notification, and the processor-executable instructions further cause the processor to:
automatically adjust the second set of account controls to remove all remaining permissions;
automatically remove the second user from the first customer account;
automatically adjust the first set of account controls to provide all permissions to the first user that were removed from the second set of account controls;
transmit a second notification to the first user device, the second notification indicating that the first set of account controls have been adjusted and that the second user has been removed from the first customer account; and
transmit a third notification to the second user device, the third notification indicating that the second user has been removed from the first customer account.

5. The system of claim 1, wherein the threshold is a first threshold, and the processor-executable instructions further cause the processor to:
determine that the control criteria has met a second threshold based on the at least one of the first customer information or the second customer information; and
establish the second customer account based on the determination that the control criteria has met the second threshold.

6. The system of claim 1, wherein the processor-executable instructions further cause the processor to establish the second customer account based on receiving a request from the first user device to configure a direct deposit of funds.

7. The system of claim 1, wherein the control criteria includes a minimum age of the first user.

8. The system of claim 7, wherein the control criteria includes a minimum period of time that the first customer account has been open.

9. A method comprising:
defining, by a processor of an account control system, a first set of account controls for a first user of a first customer account of a first account type based on first customer information entered or stored in a data storage medium, wherein the first set of account controls comprise first permissions and first restrictions, and wherein the first user is a minor;
defining, by the processor, a second set of account controls for a second user of the first customer account based on second customer information, wherein the second set of account controls comprise second permissions and second restrictions, and wherein the second user is a guardian of the first user;
determining, by the processor, that a control criteria has met a threshold based on at least one of the first customer information or the second customer information;
automatically adjusting, by the processor, the first set of account controls to increase the first permissions and decrease the first restrictions based on the determination that the control criteria has met the threshold;
receiving, by the processor, a plurality of automated account management plans, each automated account management planning defining a set of account controls;
monitoring, by the processor, a behavior of the first customer account;
automatically selecting, by the processor, an automated account management plan from the plurality of automated account management plans based on the monitored behavior;
adjusting, by the processor, the first set of account controls based on the set of account controls of the selected automated account management plan;
transmitting, by the processor, via a first graphical user interface a notification to a first user device associated with the first user and a notification via a second graphical user interface to a second user device associated with the second user, each of the notifications indicating that the first set of account controls have been adjusted are adjusted based on the set of account controls of the selected automated account management plan;
receiving, by the processor, an input via at least one of the first graphical user interface or the second graphical user interface while the first user device or the second user device are in an inactive state, wherein the input is a dismissal of the notification from the first user device or from the second user device;
in response to receiving the input, generating, by the processor, a control signal to adjust the first set of account controls based on interpreting the dismissal of the notification as acceptance to adjust the first set of account controls;
adjusting, by the processor, the first set of account controls based on the control signal;
establishing, by the processor, a second customer account associated with the first user and the second user, wherein the second customer account is a second account type different than the first account type;
linking, by the processor, a bankcard to the first customer account and the second customer account; and
activating, by the processor, the bankcard to enable the bankcard to be used to conduct a transaction with the second customer account.

10. The method of claim 9, further comprising automatically adjusting, by the processor, the second set of account controls to decrease the second permissions based on the determination that the control criteria has met the threshold.

11. The method of claim 9, wherein the notification is a first notification, the method further comprising:
automatically adjusting, by the processor, the second set of account controls to remove all remaining permissions;
automatically removing, by the processor, the second user from the first customer account;
automatically adjusting, by the processor, the first set of account controls to provide all permissions to the first user that were removed from the second set of account controls;
transmitting, by the processor, a second notification to the first user device, the second notification indicating that the first set of account controls have been adjusted and that the second user has been removed from the first customer account; and transmitting, by the processor, a third notification to the second user device, the third notification indicating that the second user has been removed from the first customer account.

12. The method of claim 9, wherein the control criteria includes a minimum age of the first user.

13. The method of claim 12, wherein the control criteria includes a minimum period of time that the first customer account has been open.

14. A non-transitory computer readable medium storing instructions that, when executed by one or more processors, cause the one or more processors to:
define a first set of account controls for a first user of a first customer account of a first account type based on first customer information entered or stored in a data storage medium, wherein the first set of account controls comprise first permissions and first restrictions, and wherein the first user is a minor;
define a second set of account controls for a second user of the first customer account based on second customer information, wherein the second set of account controls comprise second permissions and second restrictions, and wherein the second user is a guardian of the first user;
determine that a control criteria has met a threshold based on at least one of the first customer information or the second customer information;
automatically adjust the first set of account controls to increase the first permissions and decrease the first restrictions based on the determination that the control criteria has met the threshold;
receive a plurality of automated account management plans, each automated account management planning defining a set of account controls;
monitor a behavior of the first customer account;
automatically select an automated account management plan from the plurality of automated account management plans based on the monitored behavior;
adjust the first set of account controls based on the set of account controls of the selected automated account management plan;
transmit, via a first graphical user interface a notification to a first user device associated with the first user and a notification via a second graphical user interface to a second user device associated with the second user, each of the notifications indicating that the first set of account controls have adjusted based on the set of account controls of the selected automated account management plan;
receive an input via at least one of the first graphical user interface or the second graphical user interface while the first user device or the second user device are in an inactive state, wherein the input is a dismissal of the notification from the first user device or from the second user device;
in response to receiving the input, generate a control signal to adjust the first set of account controls based on interpreting the dismissal of the notification as acceptance to adjust the first set of account controls;
adjust the first set of account controls based on the control signal;
establish a second customer account associated with the first user and the second user, wherein the second customer account is a second account type different than the first account type;
link a bankcard to the first customer account and the second customer account; and activate the bankcard to enable the bankcard to be used to conduct a transaction with the second customer account.

15. The non-transitory computer readable medium of claim 14, wherein the notification is a first notification, and the one or more processors are further configured to:
- automatically adjust the second set of account controls to remove all remaining permissions;
- automatically remove the second user from the first customer account;
- automatically adjust the first set of account controls to provide all permissions to the first user that were removed from the second set of account controls;
- transmit a second notification to the first user device, the second notification indicating that the first set of account controls have been adjusted and that the second user has been removed from the first customer account; and
- transmit a third notification to the second user device, the third notification indicating that the second user has been removed from the first customer account.

\* \* \* \* \*